United States Patent
Ikeda et al.

(10) Patent No.: US 10,830,637 B2
(45) Date of Patent: Nov. 10, 2020

(54) ABNORMALITY DIAGNOSIS DEVICE AND SENSOR DETACHMENT DETECTION METHOD

(71) Applicant: NTN CORPORATION, Osaka (JP)

(72) Inventors: Hiroshi Ikeda, Mie (JP); Toru Takahashi, Mie (JP)

(73) Assignee: NTN CORPORATION, Osaka (JP)

(*) Notice: Subject to any disclaimer, the term of this patent is extended or adjusted under 35 U.S.C. 154(b) by 294 days.

(21) Appl. No.: 15/746,740

(22) PCT Filed: Jun. 27, 2016

(86) PCT No.: PCT/JP2016/069017
§ 371 (c)(1),
(2) Date: Jan. 22, 2018

(87) PCT Pub. No.: WO2017/018112
PCT Pub. Date: Feb. 2, 2017

(65) Prior Publication Data
US 2018/0224324 A1 Aug. 9, 2018

(30) Foreign Application Priority Data
Jul. 24, 2015 (JP) .................. 2015-146605

(51) Int. Cl.
*G01H 1/00* (2006.01)
*G01M 99/00* (2011.01)
(Continued)

(52) U.S. Cl.
CPC ............ *G01H 1/006* (2013.01); *G01M 15/14* (2013.01); *G01M 99/00* (2013.01); *F03D 17/00* (2016.05);
(Continued)

(58) Field of Classification Search
CPC ................................................. G01H 1/006
(Continued)

(56) References Cited

U.S. PATENT DOCUMENTS

| 7,684,951 B2* | 3/2010 | Bechtold ............. G01M 13/028 702/127 |
| 2008/0033695 A1* | 2/2008 | Sahara ................... G01H 1/003 702/185 |

FOREIGN PATENT DOCUMENTS

| CN | 101136124 A | 3/2008 |
| CN | 101825892 A | 9/2010 |

(Continued)

OTHER PUBLICATIONS

Sun et al. Translation of CN 101136124. Published Mar. 2008. Translated Jan. 2020. (Year: 2008).*

(Continued)

*Primary Examiner* — Walter L Lindsay, Jr.
*Assistant Examiner* — Philipmarcus T Fadul
(74) *Attorney, Agent, or Firm* — McDermott Will & Emery LLP

(57) ABSTRACT

An abnormality diagnosis device, which is capable of detecting that a vibration sensor is detached from a measurement object, includes a vibration sensor and a control device. The vibration sensor is attached to a measurement object, and measures vibration of the measurement object. The control device determines whether or not the vibration sensor is detached from the measurement object, based on data received from the vibration sensor. The control device calculates a first partial overall value in a first frequency band. The control device calculates a second partial overall value in a second frequency band which is higher than the first frequency band. The control device calculates an index value having a correlation with a ratio between the first partial overall value and the second partial overall value. The control device determines whether or not the vibration sensor is detached from the measurement object, based on the index value.

5 Claims, 11 Drawing Sheets

(51) Int. Cl.
*G01M 15/14* (2006.01)
*F03D 17/00* (2016.01)

(52) U.S. Cl.
CPC ....... *F05B 2260/80* (2013.01); *F05B 2260/83* (2013.01); *F05B 2270/304* (2013.01); *F05B 2270/334* (2013.01); *Y02E 10/723* (2013.01)

(58) Field of Classification Search
USPC .......................................................... 73/1.82
See application file for complete search history.

(56) References Cited

FOREIGN PATENT DOCUMENTS

| CN | 102721897 B | 1/2015 |
|---|---|---|
| JP | S62-235560 A | 10/1987 |
| JP | H02-080925 A | 3/1990 |
| JP | H09-080033 A | 3/1997 |
| JP | 2005-083752 A | 3/2005 |
| JP | 2010-160112 A | 7/2010 |
| JP | 2015-042867 A | 3/2015 |

OTHER PUBLICATIONS

Shi et al. Translated of CN 102721897. Published Jan. 2015. Translated Jan. 2020. (Year: 2015).*

Wang, Shu et al., "Automatic identification of sensor linking states in vibration acceleration detection," Modem Electronics Technique, vol. 35, No. 11, Jun. 1, 2012, with English abstract.

Office Action issued in corresponding Chinese Application No. 2016800433626, dated Jul. 22, 2019, with English translation.

Search Report issued in corresponding International Patent Application No. PCT/JP2016/069017, dated Aug. 30, 2016.

* cited by examiner

ABNORMALITY DIAGNOSIS DEVICE AND SENSOR DETACHMENT DETECTION METHOD

CROSS REFERENCE

This application is the U.S. National Phase under 35 U.S.C. § 371 of International Application No. PCT/JP2016/069017, filed on Jun. 27, 2016, which claims the benefit of Japanese Application No. 2015-146605, filed on Jul. 24, 2015, the entire contents of each are hereby incorporated by reference.

TECHNICAL FIELD

The present invention relates to an abnormality diagnosis device and a sensor detachment detection method.

BACKGROUND ART

There have been known abnormality diagnosis devices configured to diagnose whether no abnormality occurs in a measurement object by measuring vibration of the measurement object. In measuring the vibration of the measurement object, a vibration sensor is attached to the measurement object. When an abnormality occurs in this vibration sensor, abnormality diagnosis for the measurement object cannot be performed accurately.

The vibration sensor includes an acceleration sensor, for example. Japanese Patent Laying-Open No. 2010-160112 (PTD 1) discloses a self diagnosis device configured to perform self diagnosis for an acceleration sensor by applying a test signal having a predetermined magnitude to a main body of the acceleration sensor, and using an integrated value of a sensor signal output from the main body of the acceleration sensor in response to this test signal. With this self diagnosis device, even when a shock is externally applied to the acceleration sensor during the self diagnosis, the influence of the shock is suppressed, and thus accurate self diagnosis can be performed.

CITATION LIST

Patent Document

PTD 1: Japanese Patent Laying-Open No. 2010-160112

SUMMARY OF INVENTION

Technical Problem

When a shock is externally applied to the vibration sensor, the vibration sensor may be detached from the measurement object. Data measured by the vibration sensor detached from the measurement object may be erroneous data which hardly reflects the vibration of the measurement object. If an operator who analyzes the measured data from the vibration sensor fails to notice that the vibration sensor is detached from the measurement object, the operator may perform abnormality diagnosis based on this erroneous data. This may lead to an erroneous diagnostic result, and thus occurrence of an abnormality may be left unnoticed. There may also be a case where sensor detachment is found out during diagnosis, analysis of the measured data conducted so far becomes useless, and thus diagnosis should be performed again.

In order to avoid occurrence of an abnormality from being left unnoticed or avoid diagnosis from being performed again, it is necessary to detect that the vibration sensor is detached from the measurement object. However, the self diagnosis device disclosed in Japanese Patent Laying-Open No. 2010-160112 (PTD 1) cannot detect that the acceleration sensor is detached from a measurement object.

An object of the present invention is to provide an abnormality diagnosis device capable of detecting that a vibration sensor is detached from a measurement object.

Solution to Problem

In summary, the present invention is directed to an abnormality diagnosis device including a vibration sensor and a control device. The vibration sensor is attached to a measurement object, and is configured to measure vibration of the measurement object. The control device is configured to determine whether or not the vibration sensor is detached from the measurement object, based on data received from the vibration sensor. The control device is configured to calculate a first partial overall value in a first frequency band. The control device is configured to calculate a second partial overall value in a second frequency band which is higher than the first frequency band. The control device is configured to calculate an index value having a correlation with a ratio between the first partial overall value and the second partial overall value. The control device is configured to determine whether or not the vibration sensor is detached from the measurement object, based on the index value.

Preferably, the control device is configured to calculate a proportion of the first partial overall value to the second partial overall value, as the index value. The control device is configured to determine that the vibration sensor is detached from the measurement object, when the index value is higher than a predetermined threshold value. The control device is configured to determine that the vibration sensor is not detached from the measurement object, when the index value is lower than the predetermined threshold value.

Preferably, the abnormality diagnosis device is an abnormality diagnosis device for a wind turbine including a main shaft. The abnormality diagnosis device further includes a rotation speed sensor configured to measure a rotation speed of the main shaft and output the rotation speed to the control device. The control device is configured to determine whether or not the vibration sensor is detached from the measurement object, when the rotation speed is higher than a predetermined rotation speed. The control device is configured not to determine whether or not the vibration sensor is detached from the measurement object, when the rotation speed is lower than the predetermined rotation speed.

Preferably, the control device is configured to determine, at first timing, whether or not the vibration sensor is detached from the measurement object. The control device is configured to determine, at second timing which is subsequent to the first timing, whether or not the vibration sensor is detached from the measurement object. In a case where the control device determines at the second timing that the vibration sensor is detached from the measurement object, the control device is configured to issue a cautionary notice that the vibration sensor may be detached from the measurement object, when the control device has determined at the first timing that the vibration sensor is not detached from the measurement object. The control device is configured to issue a warning that the vibration sensor is detached from the measurement object, when the control device has determined at the first timing that the vibration sensor is detached from the measurement object.

In summary, another aspect of the present invention is directed to a sensor detachment detection method performed in a control device of an abnormality diagnosis device including a vibration sensor and the control device. The vibration sensor is attached to a measurement object, and is configured to measure vibration of the measurement object. The control device is configured to determine whether or not the vibration sensor is detached from the measurement object, based on data received from the vibration sensor. The sensor detachment detection method includes calculating a first partial overall value in a first frequency band. The sensor detachment detection method further includes calculating a second partial overall value in a second frequency band which is higher than the first frequency band. The sensor detachment detection method further includes calculating an index value having a correlation with a ratio between the first partial overall value and the second partial overall value. The sensor detachment detection method further includes determining whether or not the vibration sensor is detached from the measurement object, based on the index value.

Advantageous Effects of Invention

According to the present invention, detachment of the vibration sensor from the measurement object can be detected by focusing attention on frequency components which are missing in a large proportion when the vibration sensor is detached from the measurement object. This facilitates avoiding abnormality diagnosis from being performed based on data measured with the vibration sensor being detached from the measurement object.

DESCRIPTION OF EMBODIMENTS

Figure 1:
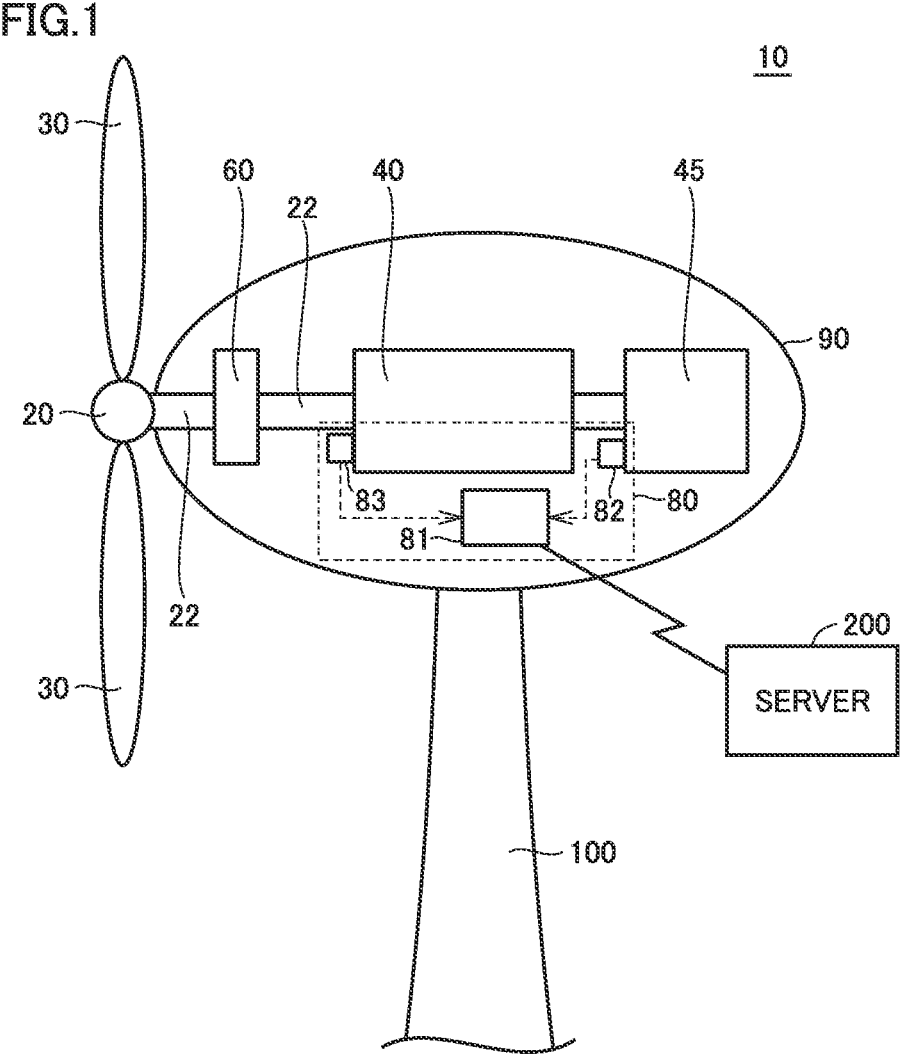
FIG. 1 is a view for illustrating a wind turbine serving as an example in which an abnormality diagnosis device of the present embodiment is used.

Hereinafter, embodiments of the present invention will be described in detail with reference to the drawings. It should be noted that identical or corresponding parts in the drawings will be designated by the same reference numerals, and the description thereof will not be repeated.

First Embodiment

FIG. 1 is a view for illustrating a wind turbine 10 serving as an example in which an abnormality diagnosis device 80 of the present embodiment is used. As shown in FIG. 1, wind turbine 10 includes a rotor head 20, a main shaft 22, blades 30, a gearbox 40, a power generator 45, a main bearing 60, abnormality diagnosis device 80, a nacelle 90, and a tower 100. Gearbox 40, power generator 45, main bearing 60, and abnormality diagnosis device 80 are accommodated in nacelle 90.

Nacelle 90 is provided at an upper end portion of tower 100. Wind turbine 10 is configured to be able to perform yaw motion which rotates nacelle 90 with respect to tower 100 fixed on the ground, in accordance with a wind direction. Preferably, nacelle 90 is rotated such that its blades 30 side is located on the windward side for an upwind-type wind power generator, and on the leeward side for a downwind-type wind power generator.

Rotor head 20 is connected to a tip portion of main shaft 22. A plurality of blades 30 are attached to rotor head 20.

Blades 30 are provided at a tip of main shaft 22 to convert a wind force into a rotary torque and transfer the rotary torque to main shaft 22.

Main shaft 22 enters nacelle 90 from rotor head 20 and is connected to an input shaft of gearbox 40, and is rotatably supported by main bearing 60. Then, main shaft 22 transfers the rotary torque generated by blades 30 which have received the wind force, to the input shaft of gearbox 40.

Main bearing 60 is fixedly provided within nacelle 90, and rotatably supports main shaft 22. Main bearing 60 is composed of a rolling bearing. Main bearing 60 is composed of a self-aligning roller bearing, a conical roller bearing, a cylindrical roller bearing, a ball bearing, or the like, for example. It should be noted that such a bearing may be a single-row or multi-row bearing.

Gearbox 40 is provided between main shaft 22 and power generator 45 to increase a rotation speed of main shaft 22 and output the rotation speed to power generator 45. As an example, gearbox 40 is composed of a gear speed-up mechanism including a planetary gear, an intermediate shaft, a high-speed shaft, and the like. It should be noted that, although not particularly shown, a plurality of bearings which rotatably support a plurality of shafts are also provided within gearbox 40.

Power generator 45 is connected to an output shaft of gearbox 40, and generates electric power by the rotary torque received from gearbox 40. Power generator 45 is composed of an induction power generator, for example. It should be noted that a bearing which rotatably supports a rotor is also provided within power generator 45.

Abnormality diagnosis device 80 receives data measured by a vibration sensor and a rotation speed sensor attached to wind turbine 10. Abnormality diagnosis device 80 transmits the data to a server 200 wirelessly or by wire.

Figure 2:
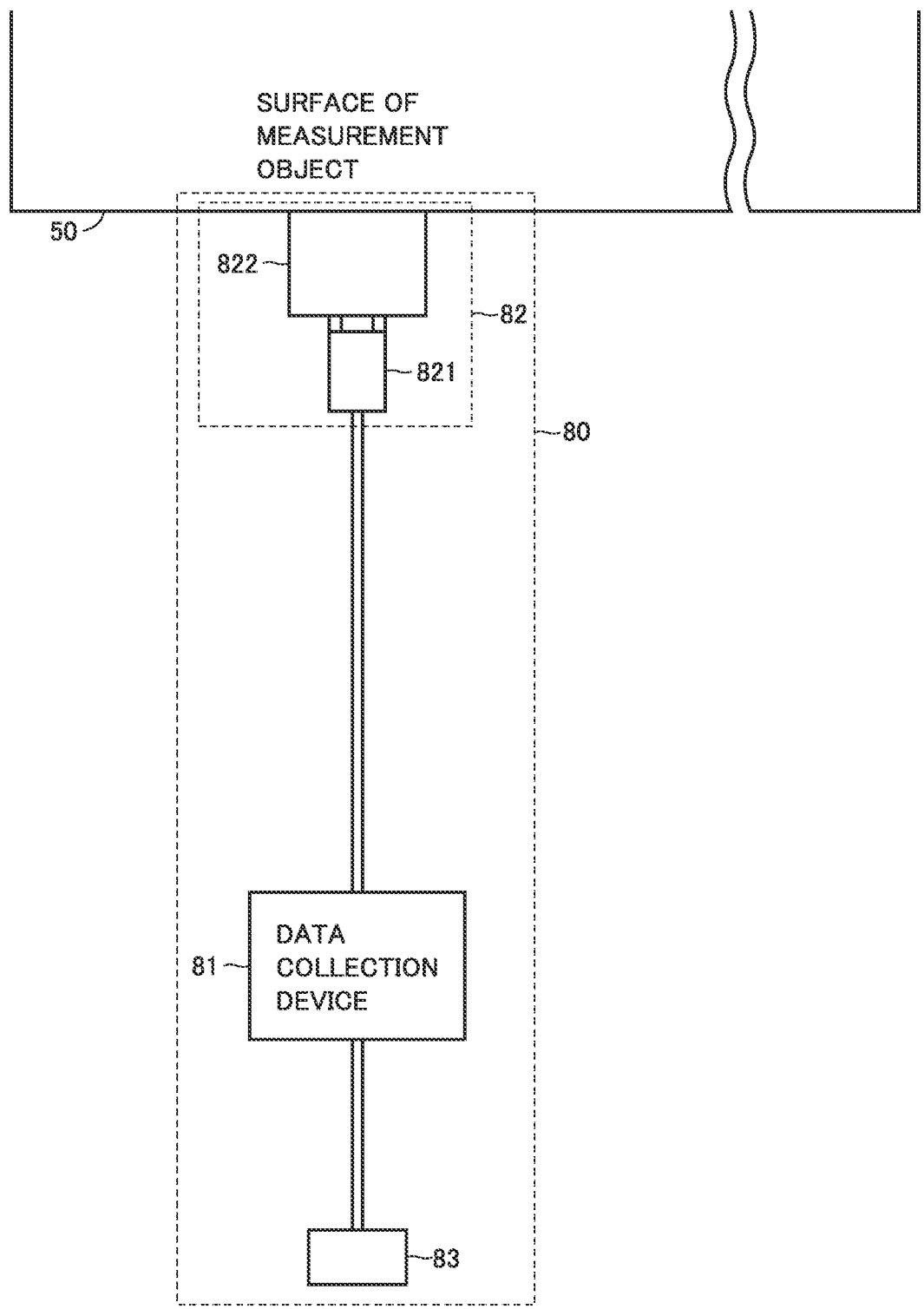
FIG. 2 is a view showing a configuration of the abnormality diagnosis device in accordance with a first embodiment.

FIG. 2 is a view showing a configuration of abnormality diagnosis device 80 in accordance with a first embodiment. As shown in FIG. 2, abnormality diagnosis device 80 includes a data collection device 81, a vibration sensor 82, and a rotation speed sensor 83. Vibration sensor 82 includes an acceleration sensor 821 and a metal base 822. Data collection device 81 corresponds to the control device of the present invention.

Acceleration sensor 821 is attached to metal base 822 by a screwing method. Metal base 822 is attached to a measurement object 50 with an adhesive or the like, for example.

When a shock is externally applied to vibration sensor 82, vibration sensor 82 may be detached from measurement object 50. For example, when a maintenance worker for measurement object 50 hits his or her hand, foot, tool, or the like on metal base 822, vibration sensor 82 may be detached from measurement object 50 by the shock.

Data measured by vibration sensor 82 detached from measurement object 50 may be erroneous data which hardly reflects the vibration of measurement object 50. If an operator who analyzes the measured data from the vibration sensor fails to notice that vibration sensor 82 is detached from measurement object 50, the operator may perform abnormality diagnosis based on this erroneous data. This may lead to an erroneous diagnostic result, and thus occurrence of an abnormality may be left unnoticed. There may also be a case where sensor detachment is found out during diagnosis, analysis of the measured data conducted so far becomes useless, and thus diagnosis should be performed again.

In particular, precise diagnosis is required for the abnormality diagnosis for a wind turbine. Accordingly, the abnormality diagnosis for a wind turbine may be performed in stages, including primary diagnosis as an automatic diagnosis, and precise diagnosis performed by a specialist. The precise diagnosis performed by a specialist requires much time and cost. Therefore, when sensor detachment is found out in the stage of the precise diagnosis, the precise diagnosis performed so far entirely becomes useless. As a result, much time and cost are required to perform the precise diagnosis again.

In view of such a problem, in the first embodiment, whether or not vibration sensor 82 is detached from measurement object 50 is determined, focusing attention on frequency components in a frequency band which are missing in a large proportion when vibration sensor 82 is detached from measurement object 50. By performing such determination, detachment of vibration sensor 82 from measurement object 50 can be detected.

Figure 3:
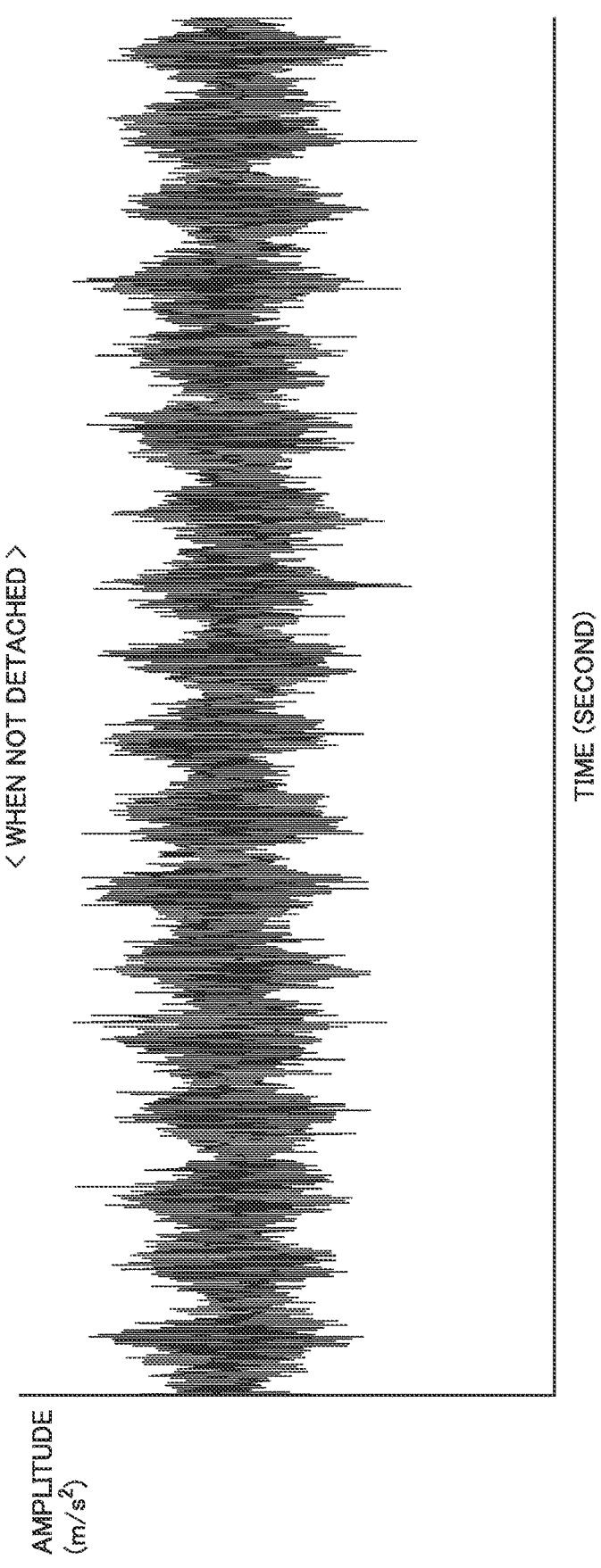
FIG. 3 is a graph of measured data measured by a vibration sensor when the vibration sensor is not detached from a measurement object.
Figure 4:
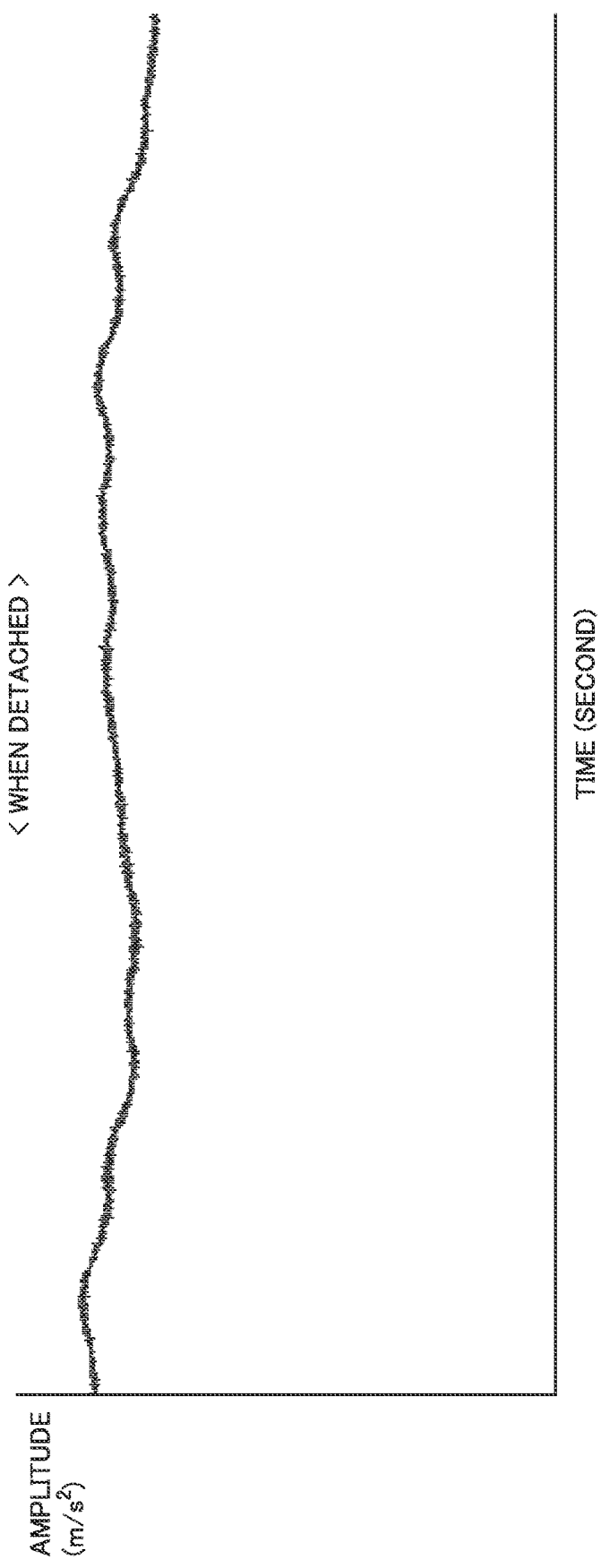
FIG. 4 is a graph of measured data measured by the vibration sensor when the vibration sensor is detached from the measurement object.

FIG. 3 is a graph showing an example of measured data measured by vibration sensor 82 when vibration sensor 82 is not detached from measurement object 5. FIG. 4 is a graph of measured data measured by vibration sensor 82 when vibration sensor 82 is detached from measurement object 50. Comparison between FIGS. 3 and 4 indicates that the graph of the measured data obtained when vibration sensor 82 is not detached from measurement object 5 (FIG. 3) has a larger amplitude. This is because vibration sensor 82 vibrates integrally with the measurement object and thereby the vibration of measurement object 50 is reflected in the measured data.

Figure 5:
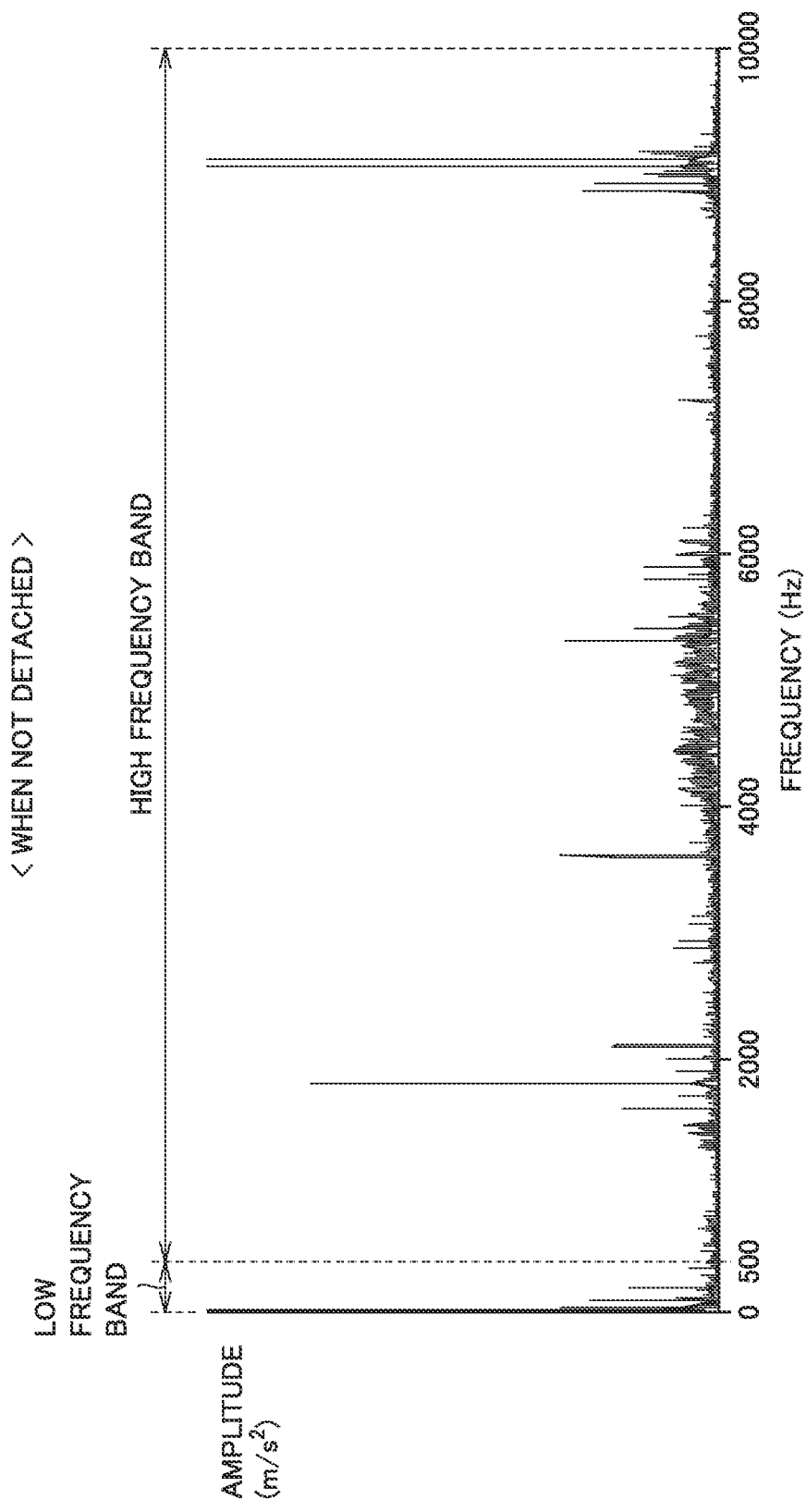
FIG. 5 is a view showing the spectrum as a result of performing frequency analysis on the measured data of FIG. 3.
Figure 6:
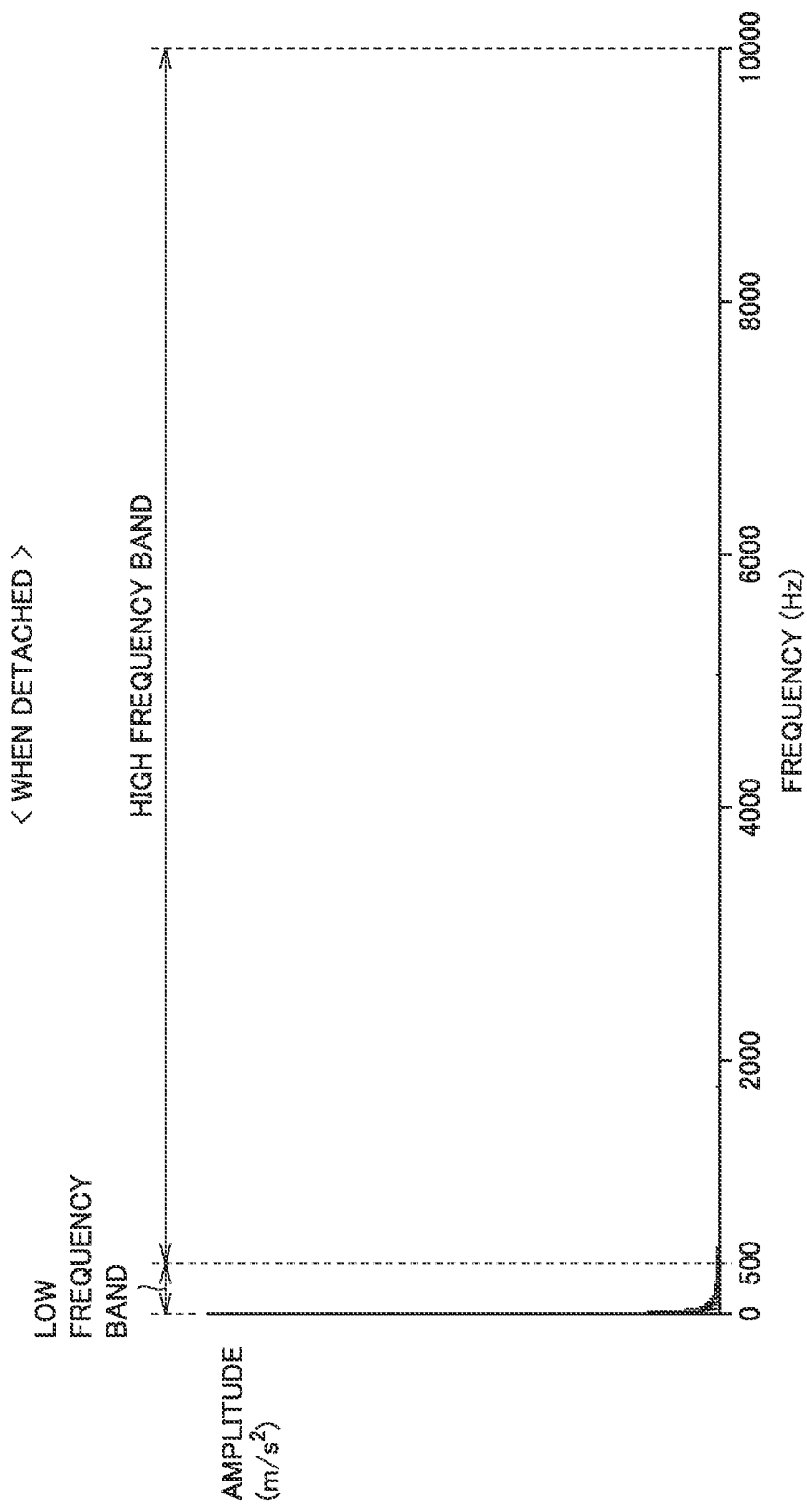
FIG. 6 is a view showing the spectrum as a result of performing frequency analysis on the measured data of FIG. 4.

FIG. 5 is a view showing the spectrum as a result of performing frequency analysis on the measured data of FIG. 3. FIG. 6 is a view showing the spectrum as a result of performing frequency analysis on the measured data of FIG. 4. Comparison between FIGS. 5 and 6 indicates that, in a frequency band of 10 Hz to 500 Hz (hereinafter also referred to as a "low frequency band"), certain frequency components in the low frequency band are included in each measured data, whereas in a frequency band of 500 Hz to 10 kHz (hereinafter also referred to as a "high frequency band"), most of the frequency components in the high frequency band are missing from the measured data in FIG. 6.

When vibration sensor 82 is detached from measurement object 50, air is interposed between vibration sensor 82 and measurement object 50. Vibration sensor 82 cannot vibrate integrally with measurement object 50. As a result, vibration sensor 82 can hardly measure the vibration of measurement object 50 having frequency components in the high frequency band. Accordingly, when vibration sensor 82 is detached from measurement object 50, the frequency components in the high frequency band are missing from the measured data in a larger degree, when compared with the frequency components in the low frequency band.

In the first embodiment, a partial overall value, which is a value as the sum of amplitudes at respective frequencies in a specific frequency band, is used as a value having a correlation with frequency components in a predetermined frequency band. Specifically, a first partial overall value (POA1) in the low frequency band and a second partial overall value (POA2) in the high frequency band of the measured data are calculated. An index value H=POA1/POA2 is calculated as an index value. When vibration sensor 82 is detached from measurement object 50, the frequency components in the high frequency band are not included in the measured data. As a result, POA2 is decreased and index value H is increased. Therefore, in the first embodiment, it is determined that vibration sensor 82 is detached from measurement object 50, when index value H is more than or equal to a predetermined threshold value.

Figure 7:
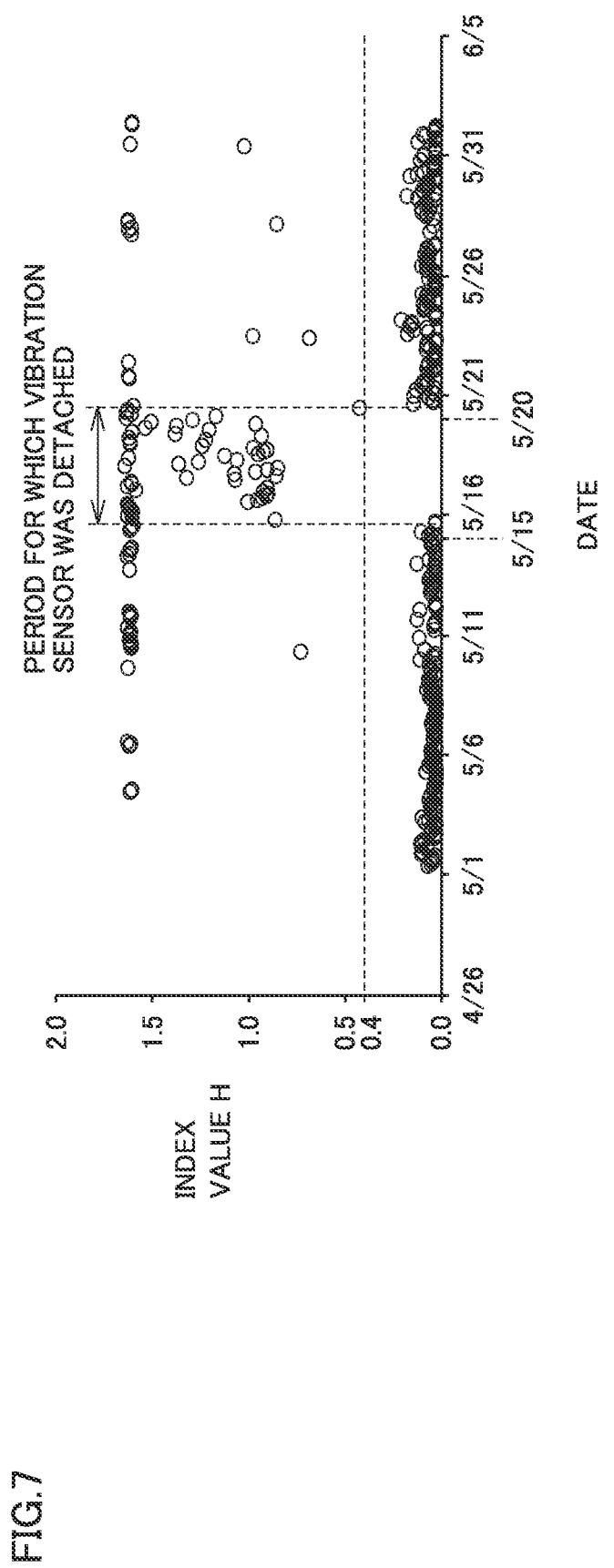
FIG. 7 is a view showing changes in an index value H.

FIG. 7 is a view showing an example of changes in index value H. FIG. 7 shows an example where vibration sensor 82 was detached from measurement object 50 from May 15 to May 20. As shown in FIG. 7, when distribution of index values H is roughly divided into two, it is divided into cases where index value H is more than or equal to 0.4, and where index value H is less than 0.4. In addition, index values H in a period for which vibration sensor 82 was detached are all more than 0.4. Therefore, in the first embodiment, it is determined that vibration sensor 82 is detached from measurement object 50 when index value H is more than or equal to 0.4, and that vibration sensor 82 is not detached from measurement object 50 when index value H is less than 0.4.

It should be noted that, in FIG. 7, index value H may be more than or equal to 0.4 also when vibration sensor 82 is not detached from measurement object 50. Even in such a case, whether or not vibration sensor 82 is detached from measurement object 50 can be determined more accurately, for example by calculating an average value of index values H from a time point going back by a predetermined period to the present time point, and determining whether or not vibration sensor 82 is detached from measurement object 50 based on whether or not this average value is higher than a predetermined threshold value.

Figure 8:
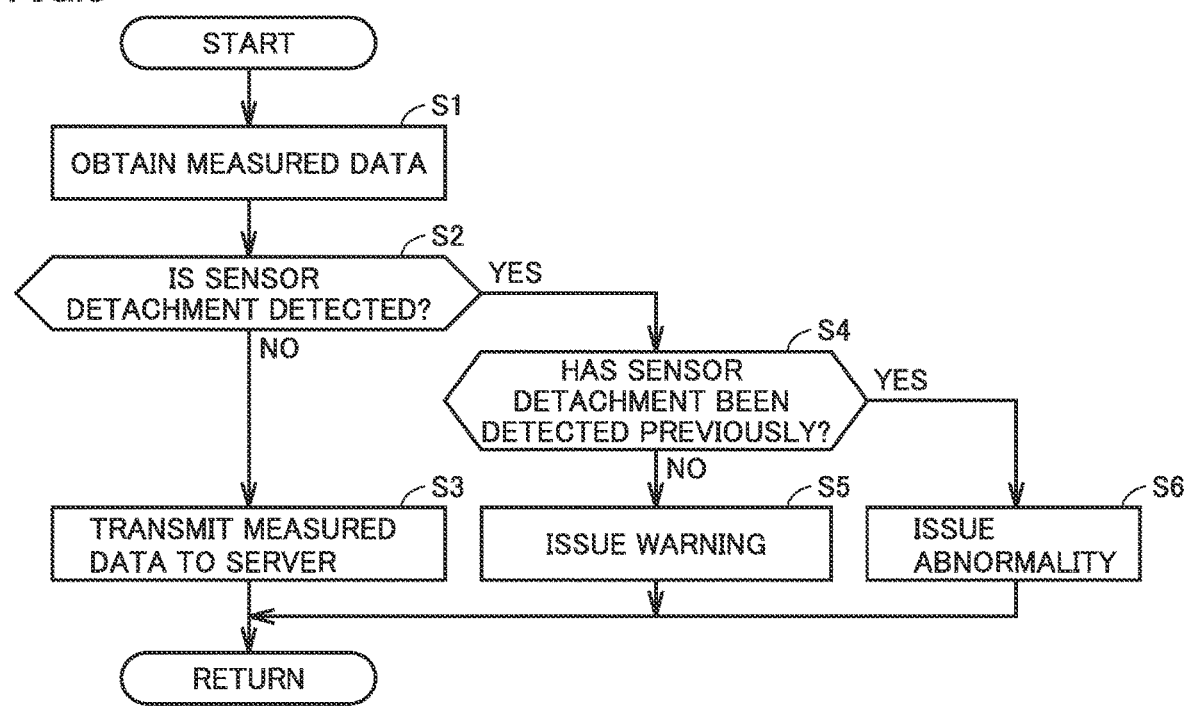
FIG. 8 is a flowchart for illustrating a flow of processing for detecting sensor detachment performed by a data collection device in the first embodiment.

FIG. 8 is a flowchart for illustrating a flow of processing for detecting sensor detachment performed by data collection device 81 in the first embodiment. The processing shown in FIG. 8 is invoked by a main routine not shown at a predetermined time interval, and is performed repeatedly. As shown in FIG. 8, in step S1, data collection device 81 obtains the measured data from vibration sensor 82, and advances the processing to step S2. In step S2, data collection device 81 determines whether or not vibration sensor 82 is detached from measurement object 50. A flow of concrete processing in step S2 will be described later.

When data collection device 81 determines that vibration sensor 82 is not detached from measurement object 50 (NO in S2), data collection device 81 advances the processing to step S3. In step S3, data collection device 81 transmits the measured data to server 200, and returns the processing to the main routine.

When data collection device 81 determines that vibration sensor 82 is detached from measurement object 50 (YES in S2), the data collection device advances the processing to step S4.

In step S4, data collection device 81 determines whether or not sensor detachment has been detected in previous sensor detachment determination (step S2). When sensor detachment has not been detected (NO in S4), data collection device 81 advances the processing to step S5. In step S5, data collection device 81 issues a cautionary notice that vibration sensor 82 may be detached from measurement object 50, and returns the processing to the main routine.

When sensor detachment has been detected (YES in S4), data collection device 81 advances the processing to step S6. In step S6, data collection device 81 issues a warning that vibration sensor 82 is detached from measurement object 50, and returns the processing to the main routine. The cautionary notice or warning can be issued for example by blinking a lamp, generating a predetermined sound, or transmitting a predetermined message to a predetermined destination.

Figure 9:
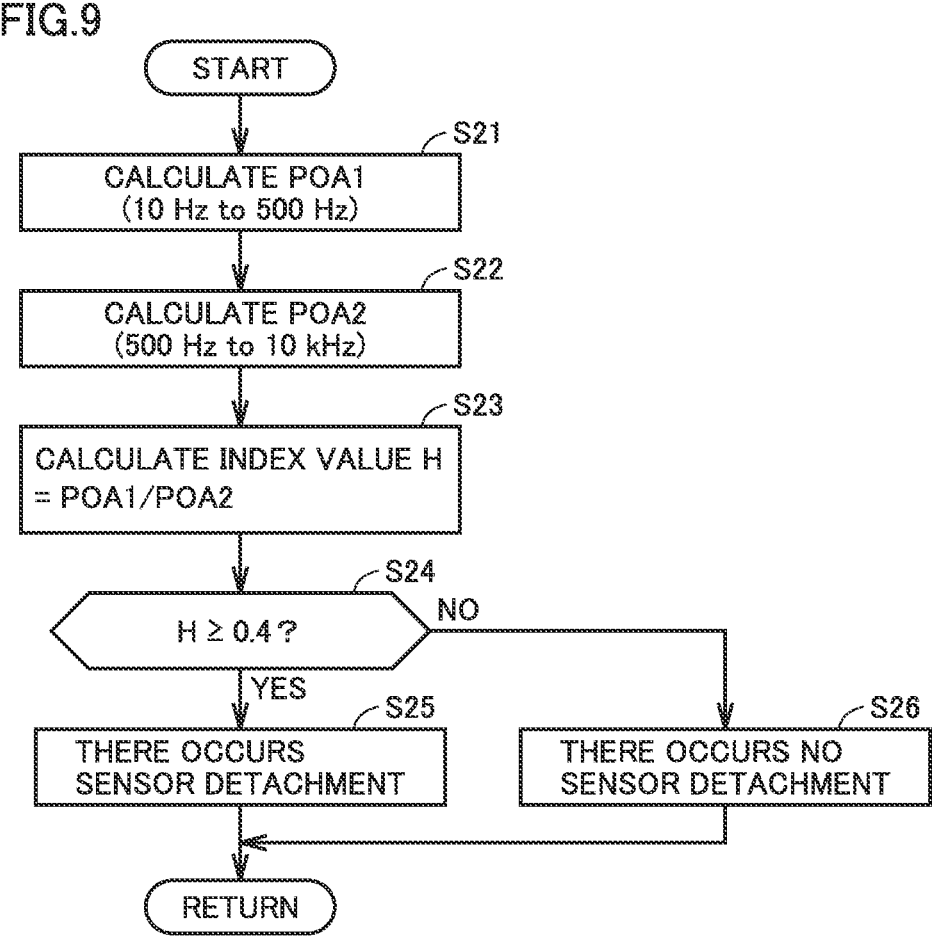
FIG. 9 is a flowchart for illustrating a flow of processing in sensor detachment determination in FIG. 8.

FIG. 9 is a flowchart for illustrating a flow of processing in sensor detachment determination (step S2) in FIG. 8. As shown in FIG. 9, in step S21, data collection device 81 calculates POA1, which is the partial overall value in the low frequency band of the measured data, and advances the processing to step S22. In step S22, data collection device 81 calculates POA2, which is the partial overall value in the high frequency band of the measured data, and advances the processing to step S23. The order of steps S21 and S22 may be opposite to the order in FIG. 9.

In step S23, data collection device 81 calculates index value H, which is the proportion of POA1 to POA2, and advances the processing to step S24.

In step S24, data collection device 81 determines whether or not index value H is more than or equal to the predetermined threshold value. In the first embodiment, 0.4 is used as the predetermined threshold value. The predetermined threshold value is not limited to 0.4, and is desirably decided as appropriate by real machine experiments or simulations, for example.

When index value H is more than or equal to 0.4 (YES in S4), data collection device 81 advances the processing to step S25. In step S25, data collection device 81 determines that there occurs sensor detachment, and returns the processing to the processing of FIG. 8. When index value H is less than to 0.4 (NO in S4), data collection device 81 advances the processing to step S26. In step S26, data collection device 81 determines that there occurs no sensor detachment, and returns the processing to the processing of FIG. 8.

As described above, with abnormality diagnosis device 80 in accordance with the first embodiment, detachment of vibration sensor 82 from measurement object 50 can be detected by focusing attention on the frequency components in the high frequency band which are missing in a large proportion when vibration sensor 82 is detached from measurement object 50. This facilitates avoiding abnormality diagnosis from being performed based on data measured with the vibration sensor being detached from the measurement object.

In the first embodiment, even when sensor detachment is detected, a cautionary notice that vibration sensor 82 may be detached from measurement object 50 is issued first. When sensor detachment is consecutively detected twice, a warning that vibration sensor 82 is detached from measurement object 50 is issued. By stepwisely changing what is issued when sensor detachment is detected as described above, it is possible to avoid the operator from determining instantly that vibration sensor 82 is detached, in a case where vibration sensor 82 is actually not detached but index value H becomes higher than 0.4 due to occurrence of an accidental event.

Second Embodiment

The first embodiment has described the case where the sensor detachment determination is performed irrespective of the state of the vibration of measurement object 50. However, depending on the state of the vibration of measurement object 50, there may be a case where the frequency components in the high frequency band are not sufficiently included in the measured data although vibration sensor 82 is not detached, and the sensor detachment determination cannot be performed accurately. A second embodiment will describe a case where the sensor detachment determination is performed only when the vibration of measurement object 50 is in a state where the frequency components in the high frequency band are sufficiently included in the measured data measured by vibration sensor 82.

In wind turbine 10 shown in FIG. 1, blades 30 receive wind and generate a rotary torque. Main shaft 22 outputs this rotary torque to gearbox 40. Gearbox 40 increases a rotation speed of main shaft 22, and outputs the rotation speed to power generator 45. Power generator 45 generates electric power by the rotary torque received from gearbox 40.

Vibration generated within wind turbine 10 is mainly caused by the rotary torque transferred within the wind turbine. Frequency components included in this vibration are in a higher frequency band as the transferred rotary torque increases. Accordingly, in the second embodiment, the sensor detachment determination is performed when the rotation speed of the main shaft is more than or equal to a predetermined rotation speed.

The second embodiment is different from the first embodiment in that whether or not the rotation speed of the main shaft is more than or equal to the predetermined rotation speed is determined before the sensor detachment determination is performed. That is, the processing of FIG. 8 is replaced by the processing of FIG. 10. Other than that, the second embodiment has the same configuration as that of the first embodiment, and thus the description thereof will not be repeated.

Figure 10:
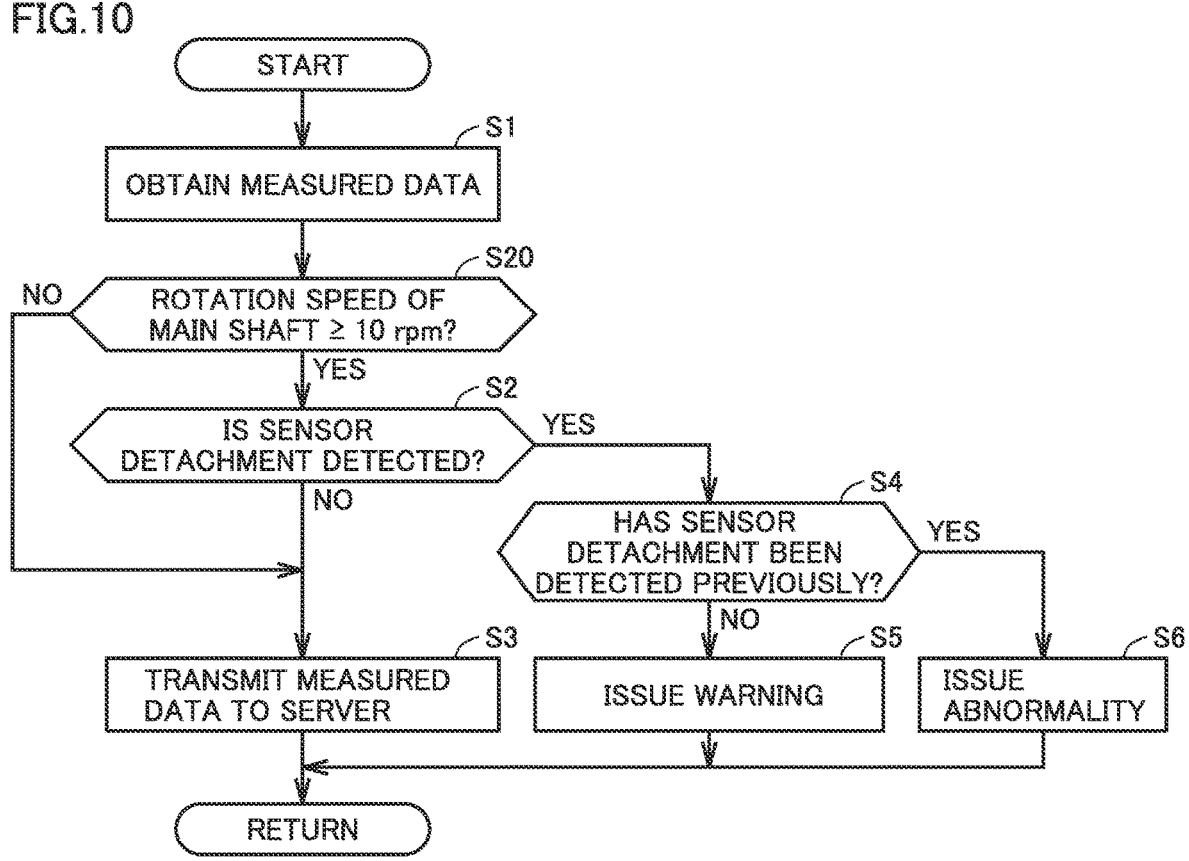
FIG. 10 is a flowchart for illustrating a flow of processing for detecting sensor detachment performed by a data collection device in a second embodiment.

FIG. 10 is a flowchart for illustrating a flow of processing for detecting sensor detachment performed by data collection device 81 in the second embodiment. The processing shown in FIG. 10 is invoked by a main routine not shown, and is performed.

As shown in FIG. 10, in step S1, data collection device 81 obtains the measured data from vibration sensor 82, and advances the processing to step S20.

In step S20, data collection device 81 determines whether or not the rotation speed of main shaft 22 is more than or equal to the predetermined rotation speed. In the second embodiment, the predetermined rotation speed is for example 10 rpm, which is half of a rated rotation speed of main shaft 22. The predetermined rotation speed is not limited to 10 rpm, and is desirably decided as appropriate by real machine experiments or simulations, for example.

Data collection device 81 performs the determination in step S20 using the measured data obtained from rotation speed sensor 83 in FIG. 2. As the rotation speed of main shaft 22, for example, a rotation speed obtained by directly measuring the rotation speed of the main shaft with rotation speed sensor 83 may be used, or a rotation speed indirectly calculated from a rotation speed obtained by measuring an output of the gearbox with rotation speed sensor 83 may be used.

When the rotation speed of main shaft 22 is more than or equal to 10 rpm (YES in S20), data collection device 81 advances the processing to step S2, and performs the same processing as that in the first embodiment thereafter.

When the rotation speed of main shaft 22 is less than 10 rpm (NO in S20), data collection device 81 skips the sensor detachment determination in step S2, and advances the processing to step S3. In step S3, data collection device 81 transmits the measured data measured by vibration sensor 82 to server 200.

Figure 11:
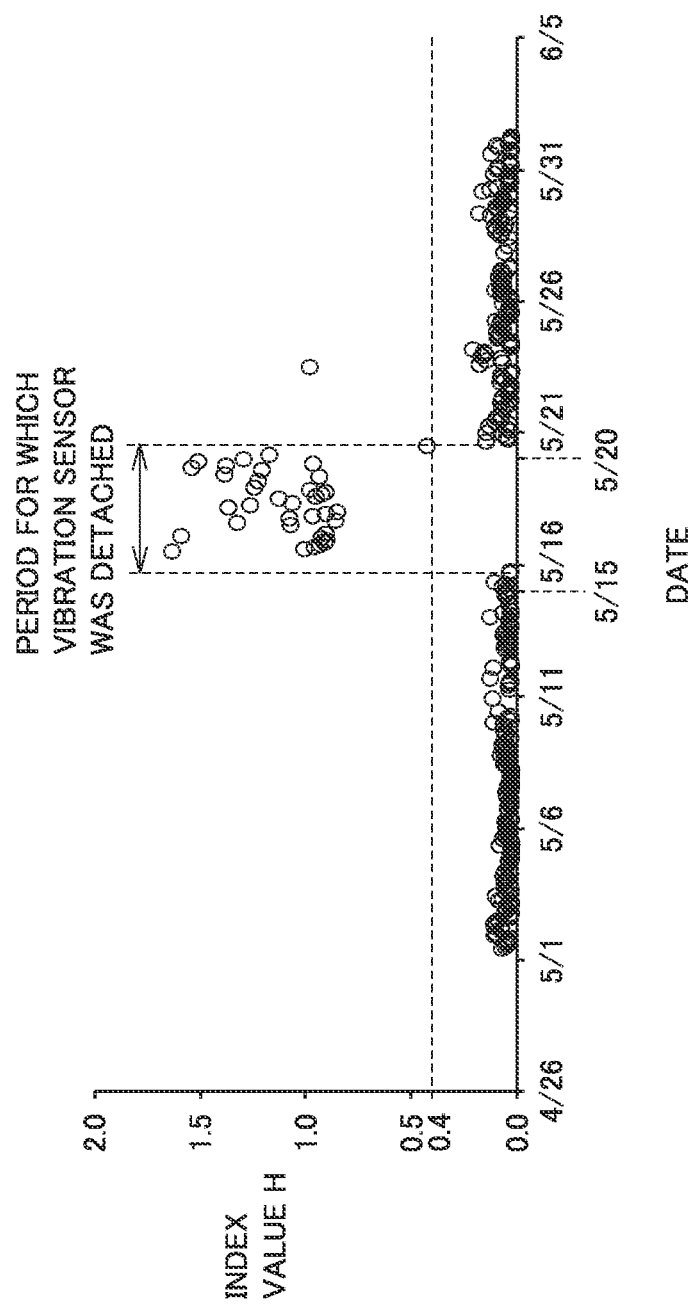
FIG. 11 is a view showing changes in index value H in the second embodiment.

FIG. 11 is a view showing changes in index value H in the second embodiment. FIG. 11 is a view corresponding to FIG. 7 in the first embodiment. As with FIG. 7, FIG. 11 shows an example where vibration sensor 82 was detached from measurement object 50 from May 15 to May 20.

Comparison is made between FIGS. 7 and 11. In FIG. 7, even in a period other than the period for which vibration sensor 82 was detached, index value H is more than or equal to 0.4 on many dates. In contrast, in FIG. 11, most of dates on which index value H is more than or equal to 0.4 are concentrated in the period for which the vibration sensor was detached.

As described above, with the abnormality diagnosis device in accordance with the second embodiment, detachment of vibration sensor 82 from measurement object 50 can be detected by focusing attention on the frequency components in the high frequency band which are missing in a large proportion when vibration sensor 82 is detached from measurement object 50. This facilitates avoiding abnormality diagnosis from being performed based on data measured with the vibration sensor being detached from the measurement object.

Furthermore, in the second embodiment, the sensor detachment determination is performed when the rotation speed of the main shaft is more than or equal to the predetermined rotation speed. In this case, the frequency components in the high frequency band are sufficiently included in the vibration of measurement object 50, and thus the accuracy of the sensor detachment determination can be higher than that in the first embodiment. This can result in avoiding a situation where, although data has been measured with vibration sensor 82 being attached to measurement object 50, the data is regarded as erroneous data measured with vibration sensor 82 being detached from measurement object 50, and is excluded from analysis objects.

The case where the measurement object of the abnormality diagnosis device is a wind turbine has been described above. The measurement object is not limited to a wind turbine. The measurement object may be of any type as long as its abnormality is diagnosed by attaching a vibration sensor thereto. The measurement object may be water and sewage equipment, a compressor, stone crushing equipment, papermaking equipment, or steel equipment, for example.

The vibration sensor is not limited to the one including an acceleration sensor, and may be of any type as long as it can measure vibration, such as a speed sensor or a contactless displacement sensor.

In the first embodiment and the second embodiment, as a method of focusing attention on the frequency components which are missing in a large proportion when the vibration sensor is detached from the measurement object, the proportion of POA1 to POA2 has been used as an index value having a correlation with the ratio between the first partial overall value (POA1) in the low frequency band and the second partial overall value (POA2) in the high frequency band of the measured data. The index value having a correlation with the ratio between POA1 and POA2 is not limited to the proportion of POA1 to POA2. For example, the proportion of POA2 to POA1 may be used as the index value. In this case, it is determined that the vibration sensor is detached from the measurement object, when the index value is less than or equal to a predetermined threshold value.

The embodiments disclosed herein are also intended to be implemented in combination as appropriate. It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

10: wind turbine; 20: rotor head; 22: main shaft; 30: blade; 40: gearbox; 45: power generator; 50: measurement object; 60: main bearing; 80: abnormality diagnosis device; 81: data collection device; 82: vibration sensor; 83: rotation speed sensor; 90: nacelle; 100: tower; 200: server; 821: acceleration sensor; 822: metal base.

The invention claimed is:

1. An abnormality diagnosis device, comprising:
a vibration sensor attached to a measurement object and configured to measure vibration of the measurement object;
a rotation speed sensor configured to measure rotation speed of the measurement object; and
a control device configured to determine whether or not the vibration sensor is detached from the measurement object, based on data received from the vibration sensor and the rotation speed sensor,
the control device being configured to
calculate a first partial overall value in a first frequency band,
calculate a second partial overall value in a second frequency band which is higher than the first frequency band,
calculate an index value having a correlation with a ratio between the first partial overall value and the second partial overall value, and
determine whether or not the vibration sensor is detached from the measurement object, based on the index value and the rotation speed of the measurement object.

2. The abnormality diagnosis device according to claim 1, wherein the control device is configured to
calculate a proportion of the first partial overall value to the second partial overall value, as the index value, determine that the vibration sensor is detached from the measurement object, when the index value is higher than a predetermined threshold value, and determine that the vibration sensor is not detached from the measurement object, when the index value is lower than the predetermined threshold value.

3. The abnormality diagnosis device according to claim 2, wherein the abnormality diagnosis device is an abnormality diagnosis device for a wind turbine including a main shaft, and the rotation speed sensor is configured to measure the rotation speed of the main shaft of the measurement object and output the rotation speed to the control device, and the control device is configured to determine whether or not the vibration sensor is detached from the measurement object, when the rotation speed is higher than a predetermined rotation speed, and not to determine whether or not the vibration sensor is detached from the measurement object, when the rotation speed is lower than the predetermined rotation speed.

4. The abnormality diagnosis device according to claim 1, wherein the control device is configured to determine, at first timing, whether or not the vibration sensor is detached from the measurement object, and determine, at second timing which is subsequent to the first timing, whether or not the vibration sensor is detached from the measurement object, and in a case where the control device determines at the second timing that the vibration sensor is detached from the measurement object, the control device is configured to issue a cautionary notice that the vibration sensor may be detached from the measurement object, when the control device has determined at the first timing that the vibration sensor is not detached from the measurement object, and issue a warning that the vibration sensor is detached from the measurement object, when the control device has determined at the first timing that the vibration sensor is detached from the measurement object.

5. A sensor detachment detection method performed in a control device of an abnormality diagnosis device including a vibration sensor, a rotation speed sensor, and the control device, the vibration sensor being attached to a measurement object and configured to measure vibration of the measurement object, the rotation speed sensor configured to measure rotation speed of the measurement object, the control device being configured to determine whether or not the vibration sensor is detached from the measurement object, based on data received from the vibration sensor and the rotation speed sensor, the sensor detachment detection method comprising:

calculating a first partial overall value in a first frequency band;

calculating a second partial overall value in a second frequency band which is higher than the first frequency band;

calculating an index value having a correlation with a ratio between the first partial overall value and the second partial overall value; and determining whether or not the vibration sensor is detached from the measurement object, based on the index value and the rotation speed of the measurement object.

* * * * *